(12) United States Patent
Kuwahara et al.

(10) Patent No.: US 7,278,748 B2
(45) Date of Patent: Oct. 9, 2007

(54) DISPLAY APPARATUS

(75) Inventors: Katsuhiko Kuwahara, Kariya (JP); Satoru Tamura, Anjo (JP)

(73) Assignee: DENSO Corporation, Kariya (JP)

( * ) Notice: Subject to any disclaimer, the term of this patent is extended or adjusted under 35 U.S.C. 154(b) by 75 days.

(21) Appl. No.: 11/073,998

(22) Filed: Mar. 8, 2005

(65) Prior Publication Data

US 2005/0212721 A1 Sep. 29, 2005

(30) Foreign Application Priority Data

Mar. 9, 2004 (JP) ............................. 2004-066138

(51) Int. Cl.
*G01D 11/28* (2006.01)
(52) U.S. Cl. .................. 362/23; 362/29; 362/489; 362/559; 362/607; 362/612; 362/613
(58) Field of Classification Search .................. 362/23, 362/28–30, 330, 559, 561, 604, 606, 607, 362/612, 613, 487–489, 812; 40/563, 564
See application file for complete search history.

(56) References Cited

U.S. PATENT DOCUMENTS 3,324,290 A * 6/1967 Lasker .......................... 40/563
2004/0027041 A1 * 2/2004 Nishikawa ................... 313/110

FOREIGN PATENT DOCUMENTS

JP         A-10-340060         12/1998

* cited by examiner

*Primary Examiner*—Stephen F Husar
*Assistant Examiner*—Meghan K. Dunwiddie
(74) *Attorney, Agent, or Firm*—Posz Law Group, PLC

(57) ABSTRACT

A display apparatus includes a display, a light source, and a light transmittance control means. The display displays a display design. The light source emits a light to illuminate the display. The light transmittance control means is disposed on at least one side of the display and includes a characteristic region for varying an exit angle of the light by varying an incident angle of the light on the light transmittance control means.

14 Claims, 6 Drawing Sheets

DISPLAY APPARATUS

CROSS REFERENCE TO RELATED APPLICATIONS

This application is based upon and claims the benefit of priority of Japanese Patent Application No. 2004-66138, filed on Mar. 9, 2004, the contents of which are incorporated herein by reference.

FIELD OF THE INVENTION

The present invention relates to a display apparatus for a vehicle and, more particularly, a stereoscopic display apparatus for displaying various pieces of information.

BACKGROUND OF THE INVENTION

A conventional display apparatus includes a transmissive liquid crystal display; light source means for illuminating the transmissive liquid crystal display from the rear side; a diffusion sheet disposed in the rear of the transmissive liquid crystal display, diffusing light from the light source means; and a holder for holding these components. The diffusion sheet not only diffuses the light from the light source means, but also has a predetermined pattern formed on it and is secured to the holder with a certain space between itself and the transmissive liquid crystal display so that the pattern can be viewed through the transmissive liquid crystal display. The conventional display apparatus is described in, for example, Japanese Patent Laid-Open Publication No. Hei 10-340060.

The pattern on the diffusion sheet thereby overlaps with a display image on the liquid crystal display screen and is visible in the background thereof, which aims at enhancing visual effects such as, for example, a sense of depth and a three-dimensional floating effect.

In such a conventional display apparatus, however, since a single flat diffusion sheet or only a single layer is disposed in the rear of a transmissive liquid crystal display, the background of a display Image on the liquid crystal display screen looks two-dimensional. Accordingly, a problem with the conventional display apparatus is that it lacks stereoscopic visual effects.

SUMMARY OF THE INVENTION

The present invention addresses the above-described problem and has an object of providing a display apparatus that can produce enhanced stereoscopic and innovative visual effects by enhancing a sense of depth in the rear of the display plate with a simple structure.

In order to achieve the object described above, the present invention employs the technical means described below.

The display apparatus according to one aspect of the invention includes a display, a light source, and a light transmittance control means. The display displays a display design. The light source is disposed behind the display for illuminating the display. The light transmittance control means is disposed at least on one of a rear and front side of the display. The light transmittance control means has a characteristic region that varies an exit angle of light emitted from the light source by varying an incident angle of the light.

According to this structure, the light from the light source inevitably passes through the light transmittance control means to be viewed by a viewer. That is, part of the light from the light source passes through the characteristic region of the light transmittance control means, in which the exit angle of light Is varied by varying the incident angle of the light from the light source, and is incident on the eyes of the viewer.

When the light from the light source passes through the area other than the characteristic region of the light transmittance control means, the incident angle to both the front and rear faces thereof is about zero degrees, so the amount of light reflected from each of the faces is very small, which indicates that the transmittance becomes nearly 100%.

When the light from the light source passes through the region of the light transmittance control means, in which the exit angle of light is varied by varying the incident angle of the light from the light source, the incident angle to the curved or sloped surface of the region of the light transmittance control means for the light from the light source becomes greater than zero degrees, thereby increasing the amount of the light reflected from the curved or sloped surface. Since this reflected light propagates in a direction different from the direction toward the viewer, it does not incident on the eyes of the viewer. As a result, the amount of light passing through the region of the light transmittance control means and being incident upon the eyes of the viewer decreases, so the curved or sloped surface of the region of the light transmittance control means looks dark as compared to the other region of the light transmittance control means. Therefore, the display is visible such that the brightness of its background is not uniform, but changes partially.

Accordingly, since the background of the display looks as if it has depth in the observation direction, the display apparatus having enhanced stereoscopic and innovative visual effects can be obtained.

In the display apparatus according to another aspect of the invention, the region of the light transmittance control means is disposed so as to surround the display design of the display.

The display design can thereby be displayed on the display as if it stands out against its background toward the viewer side, or as if it backs from its background away from the viewer, so that the display apparatus having enhanced stereoscopic and innovative visual effects can be obtained.

In the display apparatus according to yet another aspect of the invention, the region of the light transmittance control means is disposed in the periphery of the light transmittance control means, and formed so that the incident angle to the region decreases toward the periphery.

When the incident angle of the light from the light source to the region of the light transmittance control means, in which the exit angle of light is varied by varying the incident angle of the light from the light source, is zero degrees, the transmittance to the region becomes the maximum, that is, nearly 100%. The amount of reflection then increases and correspondingly the light transmittance in the region decreases, as the incident angle increases.

Accordingly, if the shape of the region is formed as described above, the transmittance of the region becomes the minimum at the inner periphery thereof and increases toward the outer periphery thereof. That is, the region is viewed such that it becomes gradually brighter from the inner periphery to the outer periphery; in other words, it is visible as a gradation of brightness.

The display apparatus having enhanced stereoscopic and innovative visual effects can thus be obtained.

The display apparatus according to yet another aspect of the invention comprises: a display plate having a display design; a light source disposed In the rear of the display plate; and a diffusion plate disposed between the display plate and the light source, diffusing the light from the light source, wherein the light from the light source passes through the diffusion plate and transmissively illuminates the display plate. In this display apparatus, light transmittance control means is disposed on at least one of the front and rear side of the display plate and has a characteristic region in which an exit angle of light is varied by varying an incident angle of the light from the light source. The characteristic region of the light transmittance control means has a curved surface or a surface sloped with respect to the display plate. The characteristic region is formed in the vicinity of the display design and on a part of at least either the front or rear surface of the light transmittance control means.

With this structure of the display apparatus, when the light emitted from the light source passes through the diffusion plate, it is diffused and reflected within the diffusion plate, thereby exiting the entire surface of the diffusion plate as the light having substantially uniform luminance. In the display apparatus according to the fourth aspect of the invention, the diffusion plate thus functions as a surface light source having uniform luminance. The light exiting the diffusion plate passes through the display plate and then the light transmittance control means, or vice versa, to be incident on the eyes of the viewer. In either case, part of the light exiting the diffusion plate inevitably passes through the characteristic region of the light transmittance control means, in which the exit angle of light is varied by varying the incident angle of the light from the light source, to be incident on the eyes of the viewer.

When the light exiting the diffusion plate passes through the area other than the characteristic region of the light transmittance control means, its incident angle to both the front and rear surfaces thereof is nearly zero degrees, so the amount of reflection from each of the surfaces is very small.

When the light exiting the diffusion plate passes through the characteristic region of the light transmittance control means, the incident angle of the light exiting the diffusion plate to the curved surface or sloped surface of the characteristic region of the light transmittance control means becomes greater than zero degrees, so the amount of reflection on the curved surface or sloped surface increases. As a result, the amount of the light passing through the characteristic region of the light transmittance control means and being incident on the eyes of the viewer decreases, so that the curved surface or sloped surface of the characteristic region of the light transmittance control means looks darker in comparison with the other area thereof. Therefore, the brightness of the background of the display plate is viewed such that it is not uniform, but changes partially.

Accordingly, the background of the display plate looks as if it has depth in the visible direction, so the display apparatus having enhanced stereoscopic and Innovative visual effects can be obtained.

In the display apparatus according to yet another aspect of the Invention, at least a part of the region of the light transmittance control means is formed so as to be projected toward the outside of the light transmittance control means.

In this case, the surface of the part of the characteristic region formed so as to be projected toward the outside of the light transmittance control means becomes a curved surface or a surface sloped with respect to the display plate. Therefore, the same effects as in the display apparatus according to the fourth aspect of the invention can be obtained, so the background of the display plate looks as if it has depth in the visible direction, thereby obtaining the display apparatus having enhanced stereoscopic and innovative visual effects.

The display apparatus according to yet another aspect of the invention has a structure in which a plurality of light transmittance control means are disposed so as to be superposed each other.

In this case, the plurality of light transmittance control means are disposed with certain distances in the observation direction; in other words, they are disposed at positions having different distances from the eyes of the viewer.

The stereoscopic effect of the background of the display plate can thereby be more enhanced, so the display apparatus having enhanced stereoscopic and innovative visual effects can be obtained.

In the display apparatus according to still another aspect of the invention, the light transmittance control means has a through-hole formed in an observation direction, and the region of the transmittance control means is substantially concentrically formed in the periphery of the hole.

In this case, since the hole area in the light transmittance control means has a light transmittance of 100%, the difference or variation of the amount of light transmitting through the region of the light transmittance control means, in which the exit angle of light is varied by varying the incident angle of the light from the light source, and the other area can be more enhanced by an effect of the light transmittance control means that limits the amount of transmitted light.

In the display apparatus according to still another aspect of the invention, the display plate is a transmissive liquid crystal display and the display design is an image displayed on the transmissive liquid crystal display.

In this case, if coloring or the like is performed on a translucent member to reduce the light transmittance, an opening is formed as a clear and colorless area, which becomes the area having a high light transmittance. The peripheral edge of the opening, which is the outline of the design, is thereby perceived by the viewer as the boundary between the areas having different brightness.

Accordingly, since the stereoscopic effect of the background of the display design can be enhanced on the display screen of the transmissive liquid crystal display, the display apparatus having enhanced stereoscopic and innovative visual effects can be obtained.

Other features and advantages of the present invention will be appreciated, as well as methods of operation and the function of the related parts from a study of the following detailed description, appended claims, and drawings, all of which form a part of this application. In the drawings:

DETAILED DESCRIPTION OF THE PREFERRED EMBODIMENTS

The display apparatus of the present invention will now be described with reference to the attached drawings illustrating embodiments in which the invention is applied to a combination meter 1 installed in an automobile.

The combination meter 1 is disposed in an instrument panel in the front of the interior of an automobile and displays various pieces of information about the operational state of the automobile on a display screen 21 of a liquid crystal panel 2 for the driver to see.

A structure of the combination meter 1 according to the first embodiment will be described below.

Figure 1:
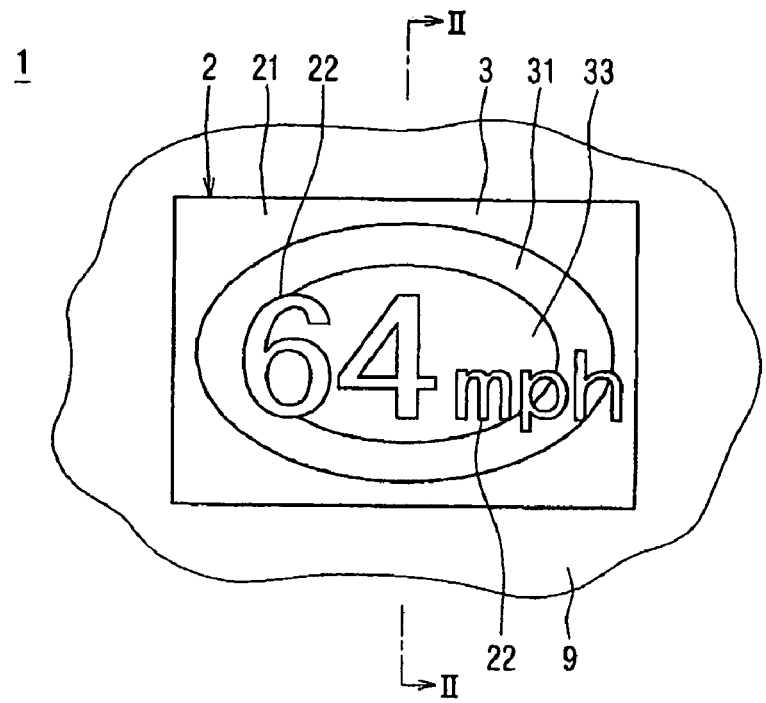
FIG. 1 is a partial front view of a display apparatus according to a first embodiment of the present invention.
Figure 2:
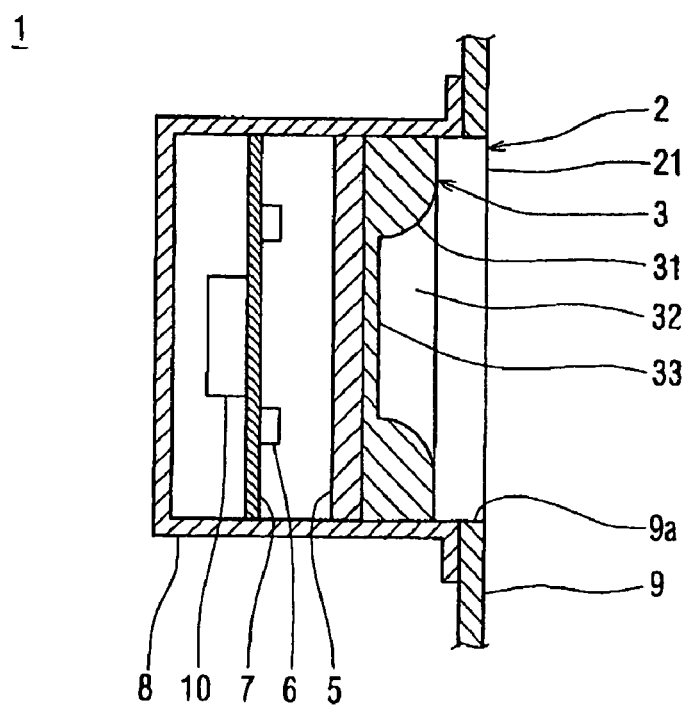
FIG. 2 is a cross-sectional view of a combination meter of the display apparatus of the first embodiment of the present invention taken through line II-II of FIG. 1.

As shown in FIG. 2, the liquid crystal panel 2 of the transmissive liquid crystal display device is attached by fitting it into an opening 9a provided in a faceplate 9 of the combination meter 1. In FIG. 2, the driver's seat is assumed to be on the right-hand side so that the combination meter 1 is visible from the right-hand side. The liquid crystal panel 2 according to the first embodiment is used as a so-called digital speed meter that numerically displays the traveling speed of the automobile as shown in FIG. 1.

In the rear of the liquid crystal panel 2, which is on the left-hand side in FIG. 2, a prism plate 3 of a light transmittance control means is disposed. The prism plate 3 is formed of a clear and colorless resin such as polycarbonate resin, acrylic resin, or the like. The prism plate 3 has a recess 32 formed along a sightline, which originates to the right and looks to the left of the device in FIG. 2. The outline of a bottom area 33 of the recess 32 is formed in an elliptical shape, as shown in FIG. 1. A sidewall 31 of the recess 32 is provided to serve as a characteristic region of the light transmittance control means. The characteristic region is formed of a curved surface to vary an exit angle of light by varying the incident angle of the light emitted from a light source. The cross-section of the characteristic region is curved, as shown in FIG. 2. In the combination meter 1 according to the first embodiment, the curve of the characteristic region forms a substantially arc shape. A diffusion sheet 5 is disposed on a side of the prism plate 3 that is opposite from the liquid crystal panel 2 (on the left-hand side of the prism plate 3 in FIG. 2). The diffusion sheet 5 diffuses the light from light emitting diodes 6 of the light source, which will be described later.

The diffusion plate 5 is made of a translucent material such as polycarbonate resin, acrylic resin, or the like, and is formed in a plate shape having a flat surface substantially identical to that of the liquid crystal panel 2. The diffusion plate 5 possesses a diffusion and reflection layer that diffuses and reflects the light incident from the light emitting diodes 6. The diffusion and reflection layer is formed with, for example, a grain surface, a dot printed layer, or a bright color (white, silver, etc.) printed layer. The light incident on the diffusion plates from the light emitting diodes 6 is reflected from the diffusion and reflection layer to exit the diffusion plate 5, thereby obtaining substantially uniform luminance across the entire diffusion plate 5. That is, the diffusion plate 5 functions as a surface light source that emits light with substantially uniform luminance, thereby obtaining substantially uniform luminance across the liquid crystal panel 2 and creating a combination meter 1 having good visual effects.

In the rear of the diffusion plate 5 (on the left-hand side in FIG. 2), the light emitting diodes 6 of the light source are disposed to transmissively illuminate the liquid crystal panel 2. The light emitting diodes 6 are mounted on and secured to a print board 7 as shown in FIG. 2. A control circuit 10 is also mounted on the print board 7. The control circuit 10 drives the liquid crystal panel 2 according to an external electronic signal, i.e., the detection signal from a car speed sensor 13 (shown in FIG. 5), to display the car speed, and controls switching of the light emitting diodes 6. The control circuit 10 is configured with, for example, a microcomputer.

The components described above, that is, the liquid crystal panel 2, the prism plate 3, the diffusion sheet 5, and the print board 7 on which the light emitting diodes 6 are mounted, are housed and secured in a casing 8 made of, for example, a plastic material. The casing 8 is attached to the rear surface of the faceplate 9, as shown in FIG. 2.

Next, a function and effect of the sidewall 31 or its effects on improving the visual effects of the combination meter 1, which characterizes the combination meter 1 according to the first embodiment, will be described with reference to FIGS. 3 and 4. The sidewall 31 is provided in the prism plate 3 and serves as the light transmittance control means, and is the characteristic region in which the exit angle of light is varied by varying the incident angle of the light from the light emitting diodes 6.

Figure 3:
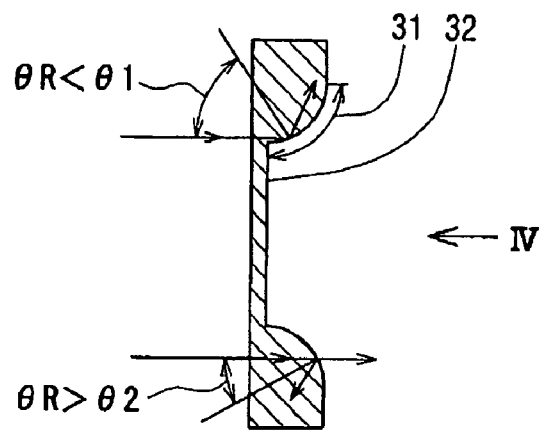
FIG. 3 is a detailed cross-sectional view of a prism plate of the combination meter of FIG. 2.
Figure 4:
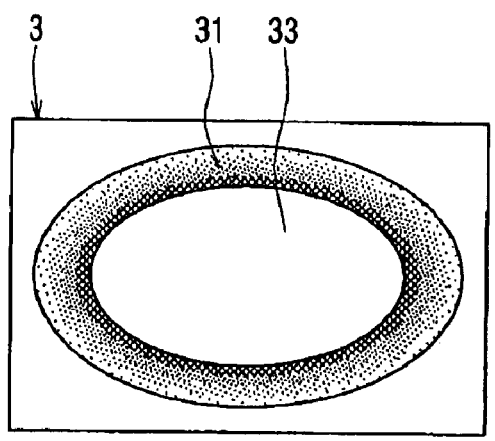
FIG. 4 is a front view of the prism plate of the first embodiment of the present invention as viewed along arrow IV in FIG. 3.

When viewed from along the sightline (right to left direction in FIG. 3), the sidewall 31, in which the exit angle of light is varied by varying the incident angle of the light from the light emitting diodes 6, is visible as an elliptical ring shape having a certain width, as shown in FIG. 4.

Part of the light, which exits the diffusion plate 5 and is incident on the prism plate 3 is incident on the sidewall 31 provided in the prism plate 3. Since the cross-section of the sidewall 31 is formed in an arc shape, as shown in FIG. 3, when the light exiting the diffusion plate 5 is Incident on the sidewall 31, the incident angle varies depending on the location on the sidewall 31. That is, the incident angle has the maximum value at the Inner peripheral edge of the sidewall 31 near the bottom area 33. The incident angle therefore, gradually decreases, as the light is incident on a location away from the bottom area 33, i.e., toward the outer periphery of the prism plate 3.

At locations in the sidewall 31 where an incident angle θ1 of the light from the diffusion plate 5 is greater than a total reflection angle θR of a material of the prism plate 3, the light exiting the sidewall 31 to the liquid crystal plate 2 is hardly present, as shown in FIG. 3, because the light exiting the diffusion plate 5 to the sidewall 31 is totally reflected therefrom. This indicates that light transmittances at these locations become nearly zero.

On the other hand, at locations in the sidewall 31 where an Incident angle θ2 of the light from the diffusion plate 5 is less than the total reflection angle θR of a material of the prism plate 3, part of the light exiting the diffusion plate 5 to the sidewall 31 is reflected therefrom and propagates again therein. The remaining part of the light exits the sidewall 31 toward the liquid crystal panel 2. In this case, the smaller the incident angle θ2 of the light from the diffusion plate 5 relative to the total reflection angle θR of a material of the prism plate 3 or, alternatively stated, the nearer the location of the incident light is to the outer periphery of the prism plate 3, the more amount of the light exits the sidewall 31 toward the liquid crystal panel 2. That is, the light transmittance increases as the angle of the light incident on the sidewall 31 decreases relative to the total reflection angle θR.

In summary, the sidewall 31, in which the exit angle of light is varied by varying the incident angle of the light from the light emitting diodes 6, forms an elliptical ring shape having a certain width as shown in FIG. 4. The light transmittance of the elliptical ring gradually increases from zero near its inner periphery to greater than zero at its outer periphery. The light transmittance then becomes the greatest at the outer periphery of the sidewall 31, that is, becomes similar to the transmittance in a flat area disposed radially outside of the sidewall 31 of the prism plate 3. That is, in the prism plate 3, the sidewall 31 is visible as an elliptical ring having a certain width in the bright background having a uniform luminance, the elliptical ring being dark in its inner periphery and becoming gradually brighter toward its outer periphery.

The viewer of the combination meter 1 according to the first embodiment can thus see the elliptical ring having a certain width, which is dark in the inner periphery and becomes gradually brighter toward the outer periphery, in the background of the liquid crystal panel 2.

Generally, when the brightness of a visible object gradually changes, the darker part is perceived as if it were more distant from the viewer.

Accordingly, in the combination meter 1 according to the first embodiment, the background of the liquid crystal panel 2 looks as if it becomes more distant from the viewer from the outer periphery to the inner periphery or, in other words, it has a sense of depth in the visible direction.

The combination meter 1 having enhanced stereoscopic and innovative visual effects can thus be obtained.

Next, an electronic circuit configuration of the combination meter 1 according to the first embodiment will be described with reference to FIG. 5, which schematically illustrates the electronic circuit configuration.

Figure 5:
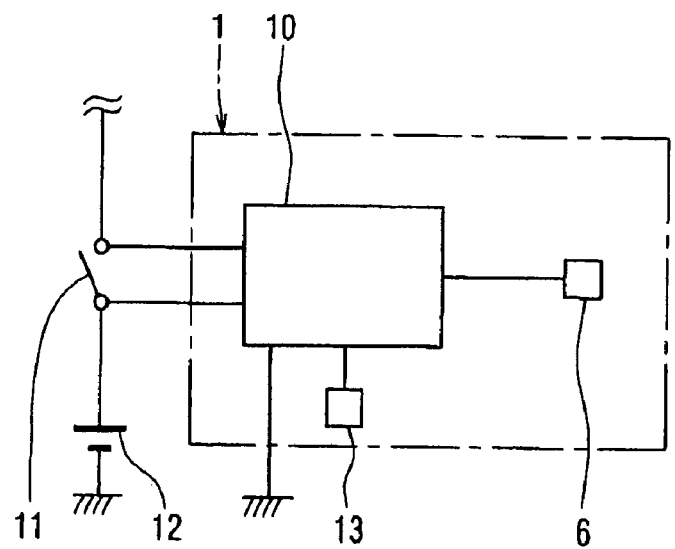
FIG. 5 is a schematic view of an electronic circuit of the display device of FIG. 1.

In the combination meter 1 according to the first embodiment, power is constantly supplied to a control circuit 10 from a battery 12 as shown in FIG. 5. An ignition switch 11 is also connected to the control circuit 10 so that its operation states (on and off states) can be detected. The liquid crystal panel 2 and the light emitting diodes 6 are also connected to the control circuit 10. Further, the car speed sensor 13 for detecting the running speed of the automobile is connected to the control circuit 10 so that the control circuit 10 can receive the detection signal.

After the ignition switch 11 has been switched on by the driver, the control circuit 10 turns on the light emitting diodes 6. The liquid crystal panel 2 is thereby transmissively Illuminated so that an image formed on the liquid crystal panel 2 becomes visible. Simultaneously, the control circuit 10 drives the liquid crystal panel 2 on the basis of the detection signal from the car speed sensor 13 to display the traveling speed of the automobile. Consequently, the traveling speed of the automobile is displayed on the liquid crystal panel 2 as a digital value, which is transmissively illuminated by the light from light emitting diodes 6 through the diffusion plate 5 and clearly viewed by the driver.

As described above, in the combination meter 1 according to the first embodiment, the prism plate 3 has the sidewall 31 with a curved surface, in which the exit angle of light is varied by varying the incident angle of the light emitted from the light emitting diodes 6, and is disposed behind the liquid crystal panel 2. The light passing through the diffusion plate 5 from the light emitting diodes 6 passes through the prism plate 3 and transmissively illuminates the liquid crystal panel 2.

In this case, the sidewall 31 is visible as an elliptical ring having a certain width, which is dark in the inner periphery and becomes gradually brighter toward the outer periphery.

Accordingly, when the viewer sees the combination meter 1 according to the first embodiment, the background area of the liquid crystal panel 2 is viewed as if it becomes more distant from the viewer from the outer periphery to the inner periphery or, in other words, as if a space with depth were present in the rear of the liquid crystal panel 2 in the visible direction.

The combination meter 1 having enhanced stereoscopic and innovative visual effects can thus be obtained.

Figure 6:
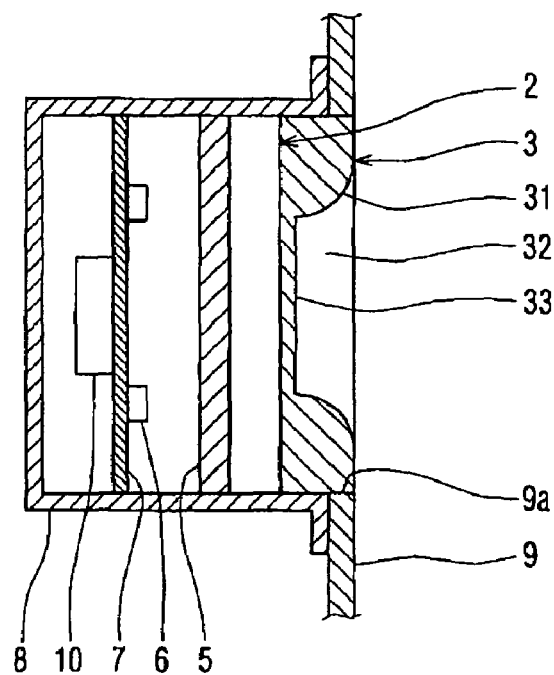
FIG. 6 is a cross-sectional view of a combination meter according to a second embodiment of the present invention.

FIG. 6 is a cross-sectional view illustrating a combination meter 1 according to a second embodiment of the present invention.

The combination meter 1 according to the second embodiment differs from the one according to the first embodiment in the position of the prism plate 3. That is, in the combination meter 1 according to the second embodiment, as shown in FIG. 6, the prism plate 3 is disposed in front of the liquid crystal panel 2 or on the viewer side.

In this case, as in the combination meter 1 according to the first embodiment, the sidewall 31 in the prism plate 3 is visible in the bright background with uniform luminance as an elliptical ring having a certain width, which is dark in the inner periphery and becomes gradually brighter toward the outer periphery.

The liquid panel 2 is viewed as if it were disposed at the deepest position or at the furthest position from the viewer in the space with depth created by an effect of the prism plate 3 in the visible direction.

The combination meter 1 having enhanced stereoscopic and innovative visual effects can thus be obtained.

Figure 7:
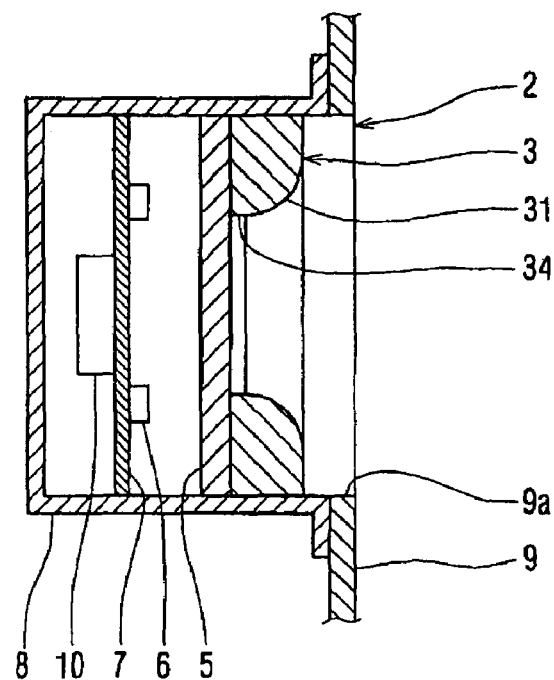
FIG. 7 is a cross-sectional view of a combination meter according to a third embodiment of the present invention.

FIG. 7 is a cross-sectional view illustrating the combination meter 1 according to a third embodiment of the present invention.

The combination meter 1 according to the third embodiment differs from the one according to the first embodiment in the shape of the prism plate 3. That is, in the combination meter 1 according to the third embodiment, the bottom area 33 in the prism plate 3 according to the first embodiment is removed to form a through-hole 34 as shown in FIG. 7.

In this case, as in the combination meter 1 according to the first embodiment, the sidewall 31 in the prism plate 3 is visible in the bright background with uniform luminance as an elliptical ring having a certain width, which is dark in the inner periphery and becomes gradually brighter toward the outer periphery.

Accordingly, when the viewer sees the combination meter 1 according to the third embodiment, the background area of the liquid crystal panel 2 looks as if it becomes more distant from the viewer from the outer periphery to the inner periphery or, in other words, as if a space with depth were present in the rear of the liquid crystal panel 2 in the visible direction.

The combination meter 1 having enhanced stereoscopic and Innovative visual effects can thus be obtained.

Figure 8:
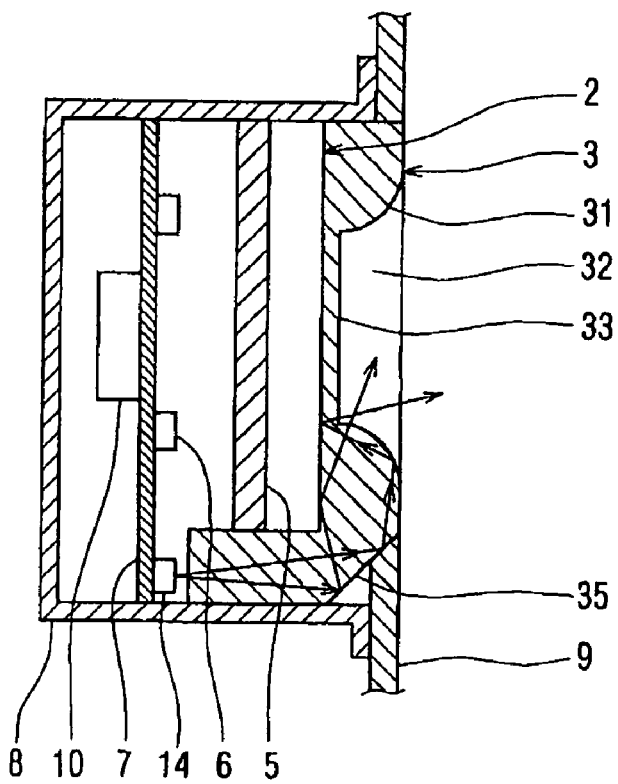
FIG. 8 is a cross-sectional view of a combination meter according to a fourth embodiment of the present invention.

FIG. 8 is a cross-sectional view illustrating the combination meter 1 according to a fourth embodiment of the present invention.

The combination meter 1 according to the fourth embodiment differs from the one according to the second embodiment in that the prism plate 3 is structured so as to emit light and display itself. That is, as shown in FIG. 8, a light emitting diode 14 is mounted on the print board 7, and the light emitted from the light emitting diode 14 is guided into the prism plate 3. As shown In FIG. 8, the light from the light emitting diode 14 is incident onto the prism plate 3 and reflected from a reflective surface 35, after which it is repeatedly reflected from the surface of the liquid crystal panel 2 and the like until it exits the prism plate 3.

In this case, since the prism plate 3 is transmissively illuminated by the light from the light emitting diode 14, the stereoscopic effect of the sidewall 31, in which the exit angle of light is varied by varying the incident angle of the light from the light emitting diodes 6, is further intensified.

The combination meter 1 having more enhanced stereoscopic and innovative visual effects can thus be obtained.

Figure 9A:
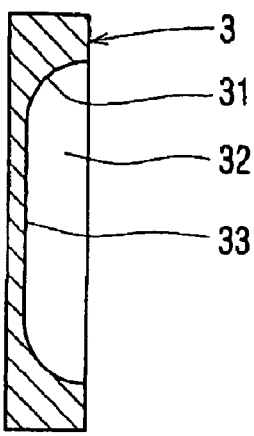
FIG. 9A is a cross-sectional view of a prism plate of a combination meter according to a fifth embodiment of the present invention.
Figure 9B:
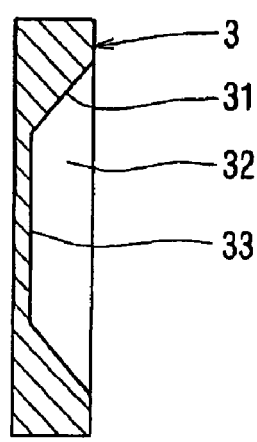
FIG. 9B is a cross-sectional view of a prism plate of a combination meter according to a sixth embodiment of the present invention.
Figure 9C:
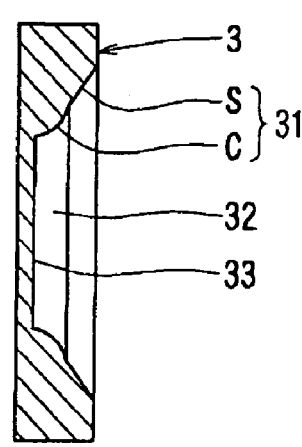
FIG. 9C is a cross-sectional view of a prism plate of a combination meter according to a seventh embodiment of the present invention.

In each of the first to fourth embodiments described above, the cross-sectional shape of the sidewall 31, which is provided in the prism plate 3 and is the characteristic region in which the exit angle of light is varied by varying the incident angle of the light from the light emitting diodes 6, is formed in an arc shape projected toward the viewer side as shown in FIG. 3, but it is not necessarily restricted to this shape. It may be formed in other shapes. For example, a fifth embodiment shown in FIG. 9A includes an elliptical shape oppositely recessed to the viewer side. It may also be formed in a straight line shape sloped with respect to the liquid crystal panel 2 as provided in a sixth embodiment that is shown in FIG. 9B, or in a combination shape of a curved line C and straight line S as provided in a seventh embodiment that is shown in FIG. 9C.

Figure 10:
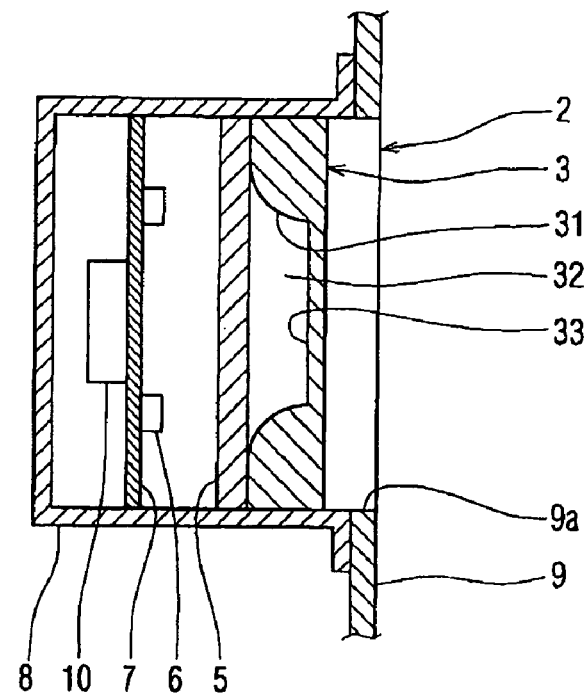
FIG. 10 is a cross-sectional view of a combination meter according to an eighth embodiment of the present invention.

In each of the first to seventh embodiments described above, the sidewall 31, In which the exit angle of light is varied by varying the incident angle of the light from the light emitting diodes 6, is provided on the front side of the prism plate 3 or on the side toward the viewer, but it is not necessarily restricted to this side. It may be provided on the rear side of the prism plate 3 or on the side opposite to the viewer as provided in an eighth embodiment and shown in FIG. 10.

Figure 11:
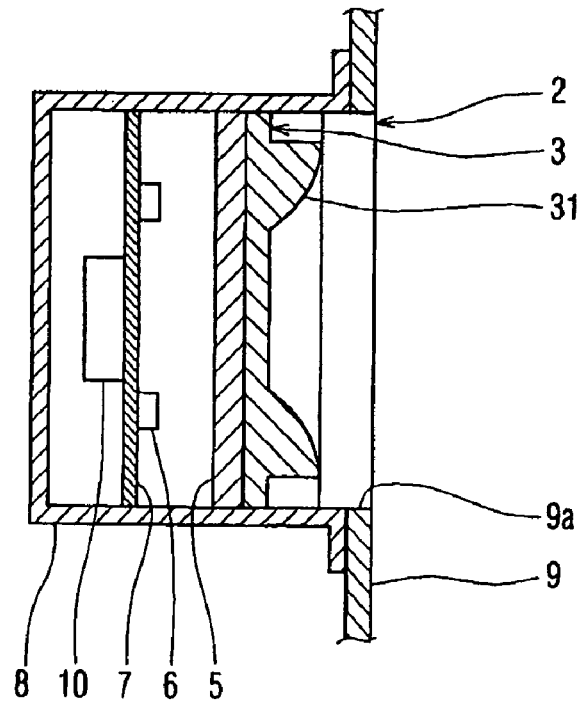
FIG. 11 is a cross-sectional view of a combination meter according to e ninth embodiment of the present invention.

In each of the first to seventh embodiments described above, the sidewall 31, in which the exit angle of light is varied by varying the incident angle of the light from the light emitting diodes 6, is formed inside the flat prism plate 3 in the thickness direction of the plate, but it may be formed outside the flat prism plate 3 in the thickness direction of the plate as provided in a ninth embodiment and shown in FIG. 11. In other words, it may be formed so as to project from the surface of the flat prism plate 3 toward the outside.

Figure 12:
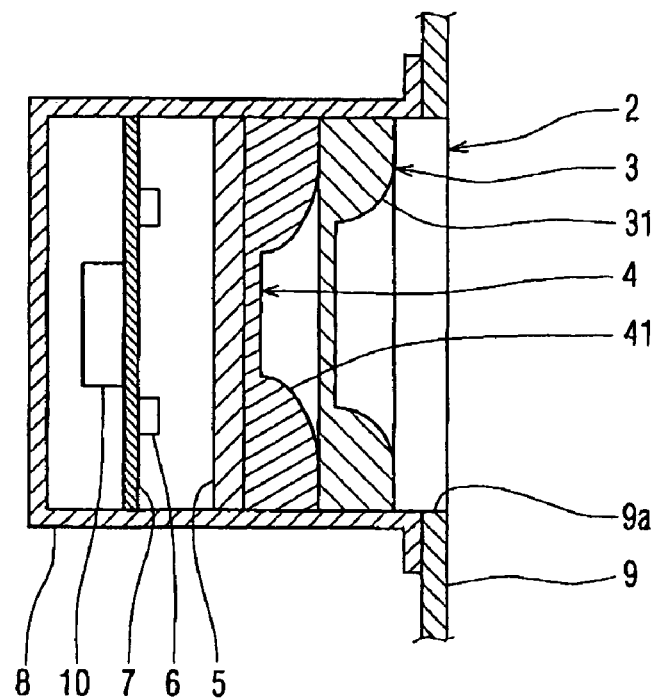
FIG. 12 is a cross-sectional view of a combination meter according to a tenth embodiment of the present invention.

FIG. 12 is a cross-sectional view of the combination meter 1 according to a tenth embodiment of the present invention.

In each of the first to ninth embodiments described above, the combination meter 1 has a single prism plate 3.

In the combination meter 1 according to the tenth embodiment, however, two prism plates, i.e., prism plates 3 and 4, are superposed and disposed behind the liquid crystal panel 2.

In this case, the sidewall 31 in the prism plate 3, in which the exit angle of light is varied by varying the incident angle of the light from the light emitting diodes 6, and the sidewall region 41 in the prism plate 4 of the light transmittance control means are visible such that they partially overlap each other. Therefore, the viewer perceives a more complex stereoscopic shape in the rear of the liquid crystal panel 2.

The combination meter 1 having more enhanced stereoscopic and innovative visual effects can thus be obtained.

Figure 13:
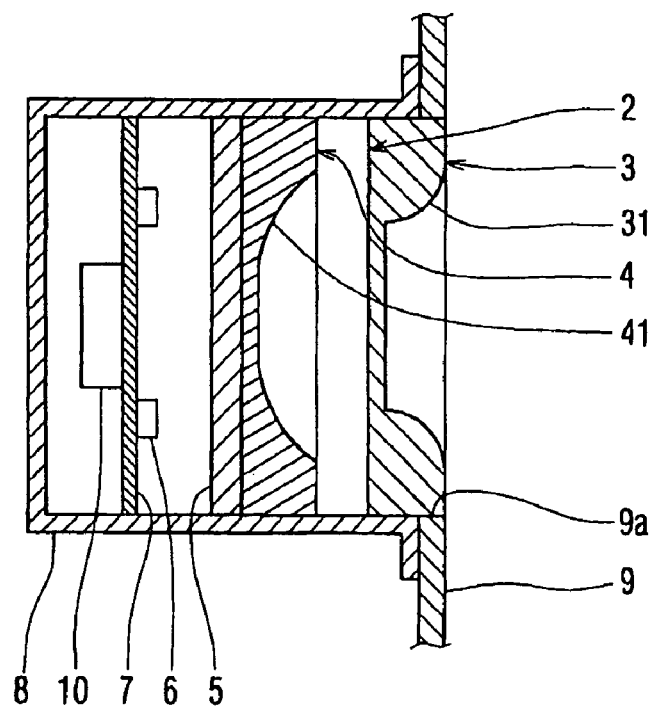
FIG. 13 is a cross-sectional view of a combination meter according to an eleventh embodiment of the present invention.

FIG. 13 is a cross-sectional view of the combination meter 1 according to an eleventh embodiment of the present invention.

In the combination meter 1 according to the tenth embodiment described above, the two prism plates 3 and 4 are superposed and disposed behind the liquid crystal plane 2.

In the combination meter 1 according to the eleventh embodiment, however, two prism plates 3 and 4 are disposed on opposite sides of the liquid crystal panel 2. That is, as shown in FIG. 13, the prism plates 3 and 4 are disposed on the front and rear sides of the liquid crystal panel 2, respectively.

In this case, when the viewer sees the combination meter 1, the viewer can have a sense of depth created on both the front and rear sides of the liquid crystal panel 2 by the visual effects of the sidewall 31 serving as the light transmittance means in the prism plate 3 and sidewall region 41, in which the exit angle of light is varied by varying the incident angle of the light from the light emitting diodes 6. In other words, the liquid crystal panel 2 is perceived as if it were floating at an intermediate position in the space with depth created in the visible direction.

The combination meter 1 having more enhanced stereoscopic and innovative visual effects can thus be obtained.

In the combination meter 1 according to the first to eleventh embodiments described above, the light emitting diodes 6 and 14 are used as light sources, but the light source is not necessarily limited to using light emitting diodes. Other types of light sources may be used, such as a light bulb, an electric discharge tube, an electroluminescence (EL) panel, and the like.

In the combination meter 1 according to the first to eleventh embodiments described above, the running speed of the automobile is digitally displayed on the liquid crystal panel 2, but display information is not necessarily limited to the running speed. It may be replaced to other information such as engine rotational speed, time, driving distance, temperature of cooling water, and the like, or these may be added to the display information.

In the combination meter 1 according to the first to eleventh embodiments described above, the liquid crystal panel 2 is used as a display plate being transmissively illuminated, but the display plate is not necessarily limited to the liquid crystal panel 2. Other types of display members that can be transmissively illuminated may be used.

What is claimed is:

1. A display apparatus comprising:
   a display for displaying a display design;
   a light source for emitting a light to illuminate the display; and
   a light transmittance control means disposed on at least one side of the display and including a characteristic region for varying an exit angle of the light by varying an incident angle of the light on the light transmittance control means, wherein the light transmittance control means includes a prism plate and the characteristic region includes a recess formed in the prism plate.

2. The display apparatus of according to claim 1, wherein the recess includes a substantially uniform shoulder having at least one of a convex profile portion, a concave profile portion, and a chamfered profile portion.

3. A display apparatus comprising:
a display for displaying a display design;
a light source for emitting a light to illuminate the display; and
a light transmittance control means disposed on at least one side of the display and including a characteristic region for varying an exit angle of the light by varying an incident angle of the light on the light transmittance control means, wherein the light transmittance control means includes a first prism plate disposed on a first side of the display and a second prism plate disposed on a second side of the display that is opposite the first side.

4. A display apparatus comprising:
a display panel having a display design;
a light source disposed behind the display panel for emitting a light;
a diffusion plate disposed between the display panel and the light source for diffusing the light, the light from the light source passing through the diffusion plate and transmissively illuminating the display panel; and
a light transmittance control means disposed on at least one side of the display panel and having a characteristic region in the vicinity of the display design defining one of a curved surface and a chamfered surface, wherein the characteristic region varies an exit angle of the light by varying an incident angle of the light from the light source, whereby transmittance of the light passing through the characteristic region is varied such that gradation is added to a background or a foreground of the display design displayed by the display.

5. A display apparatus comprising:
a display panel having a display design;
a light source disposed behind the display panel for emitting a light;
a diffusion plate disposed between the display panel and the light source for diffusing the light, the light from the light source passing through the diffusion plate and transmissively illuminating the display panel; and
a light transmittance control means disposed on at least one side of the display panel and having a characteristic region in the vicinity of the display design defining one of a curved surface and a chamfered surface, wherein the characteristic region varies an exit angle of the light by varying an incident angle of the light from the light source; and wherein at least a part of the characteristic region of the light transmittance control means is formed as a projection.

6. A display apparatus comprising:
a display panel having a display design; a light source disposed behind the display panel for emitting a light;
a diffusion plate disposed between the display panel and the light source for diffusing the light, the light from the light source passing through the diffusion plate and transmissively illuminating the display panel; and
a light transmittance control means disposed on at least one side of the display panel and having a characteristic region in the vicinity of the display design defining one of a curved surface and a chamfered surface, wherein the characteristic region varies an exit angle of the light by varying an incident angle of the light from the light source, and wherein the light transmittance control means includes a prism plate and at least a part of the characteristic region includes a recess formed in the prism plate.

7. The display apparatus according to claim 4, wherein the light transmittance control means includes a plurality of light prism plates disposed adjacent to each other.

8. A display apparatus comprising:
a display panel having a display design; a light source disposed behind the display panel for emitting a light;
a diffusion plate disposed between the display panel and the light source for diffusing the light, the light from the light source passing through the diffusion plate and transmissively illuminating the display panel; and
a light transmittance control means disposed on at least one side of the display panel and having a characteristic region in the vicinity of the display design defining one of a curved surface and a chamfered surface, wherein the characteristic region varies an exit angle of the light by varying an incident angle of the light from the light source, and wherein the light transmittance control means includes a first prism plate disposed on a first side of the display panel and a second prism plate disposed on a second side of the display pane that is opposite the first side.

9. A display apparatus comprising:
a display panel having a display design; a light source disposed behind the display panel for emitting a light;
a diffusion plate disposed between the display panel and the light source for diffusing the light, the light from the light source passing through the diffusion plate and transmissively illuminating the display panel; and
a light transmittance control means disposed on at least one side of the display panel and having a characteristic region in the vicinity of the display design defining one of a curved surface and a chamfered surface, wherein the characteristic region varies an exit angle of the light by varying an incident angle of the light from the light source, and wherein the light transmittance control means defines a through-hole and the characteristic region is substantially concentrically aligned about a periphery of the through-hole.

10. The display apparatus according to claim 4, wherein the display panel includes a transmissive liquid crystal display and the display design is an image displayed on the transmissive liquid crystal display.

11. A display apparatus comprising: a display panel; a light source for emitting a light toward the display panel; a light transmittance control plate disposed in series with the display panel and the light source; and a characteristic region defined by the light transmittance control plate including at least one of a rounded profile portion and a chamfered profile portion for altering a travel path of the light to produce a stereoscopic display on the display panel.

12. The display apparatus according to claim 11, wherein the characteristic region includes an inner periphery and an outer periphery and an angle of incidence of the light near the inner periphery is greater than an angle of incidence of the light near the outer periphery.

13. The display apparatus according to claim 11, wherein the characteristic region includes a recess formed in the light transmittance control plate and the one of the rounded profile portion and the chamfered profile portion defines a sidewall of the recess.

14. The display apparatus according to claim 11, wherein the light transmittance control plate includes a through-hole and the characteristic region defines a sidewall of the through-hole.

* * * * *